(12) United States Patent
Theppasandra et al.

(10) Patent No.: US 8,498,385 B2
(45) Date of Patent: Jul. 30, 2013

(54) CHANGING REDIRECTION INFORMATION FOR TELECOMMUNICATIONS DEVICES VIA A VOICEMAIL SYSTEM OR CALL HANDLING SERVER

(75) Inventors: Janardhan Theppasandra, Issaquah, WA (US); Nancy Bostdorff, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 844 days.

(21) Appl. No.: 12/479,683

(22) Filed: Jun. 5, 2009

(65) Prior Publication Data

US 2010/0310057 A1  Dec. 9, 2010

(51) Int. Cl.
*H04M 1/64* (2006.01)
(52) U.S. Cl.
USPC .................................. 379/88.04; 379/201.02
(58) Field of Classification Search
USPC ........................................ 379/88.23, 88.04
See application file for complete search history.

(56) References Cited

U.S. PATENT DOCUMENTS

| | | | |
|---|---|---|---|
| 6,757,745 B1 * | 6/2004 | Hamann et al. | 709/250 |
| 7,095,838 B1 * | 8/2006 | Kanerva et al. | 379/211.02 |
| 7,242,754 B2 * | 7/2007 | Adams et al. | 379/201.02 |
| 7,477,907 B2 * | 1/2009 | Koch et al. | 455/456.2 |
| 2007/0060137 A1 * | 3/2007 | Yeatts et al. | 455/445 |
| 2008/0043969 A1 * | 2/2008 | Shi | 379/211.02 |
| 2008/0045178 A1 * | 2/2008 | Venkatachalam | 455/404.2 |

* cited by examiner

*Primary Examiner* — Curtis Kuntz
*Assistant Examiner* — Amal Zenati
(74) *Attorney, Agent, or Firm* — Perkins Coie LLP

(57) ABSTRACT

A system and method for updating call redirection information and other communication redirection information. The system is integrated with and accessed by a subscriber via a voicemail system or call handling server. The system may present one or more options to a subscriber to provide call redirection information. The subscriber may provide call redirection information, such as an alternate number, via an interactive voice response (IVR) component of the voicemail system or call handling server. The subscriber may also access the system and provide call redirection information via a voicemail system or call handling server web interface, a user-selectable menu on the subscriber's telecommunications device, and so on. The system communicates with other components in a telecommunication network to provide the call redirection information and enable calls to a telecommunications device to be appropriately redirected or deflected.

19 Claims, 9 Drawing Sheets

CHANGING REDIRECTION INFORMATION FOR TELECOMMUNICATIONS DEVICES VIA A VOICEMAIL SYSTEM OR CALL HANDLING SERVER

BACKGROUND

Although service providers build telecommunication networks to provide coverage in as many areas as possible, there are still areas within the country and throughout the world that offer poor reception to subscribers within a network. For example, not all locations are within the range of cell towers, devices within an area may interfere with a network, and so on. Thus, at times subscribers may be unable to receive calls, messages and/or other synchronous or asynchronous communications using their telecommunications devices.

As may be expected, service providers are hesitant to admit that their networks do not provide adequate coverage for all subscribers in all locations, and may not provide solutions that draw attention to such deficiencies. The need exists for a method and system that overcomes these problems and progresses the state of the art, as well as one that provides additional benefits.

DETAILED DESCRIPTION

Figure 1:
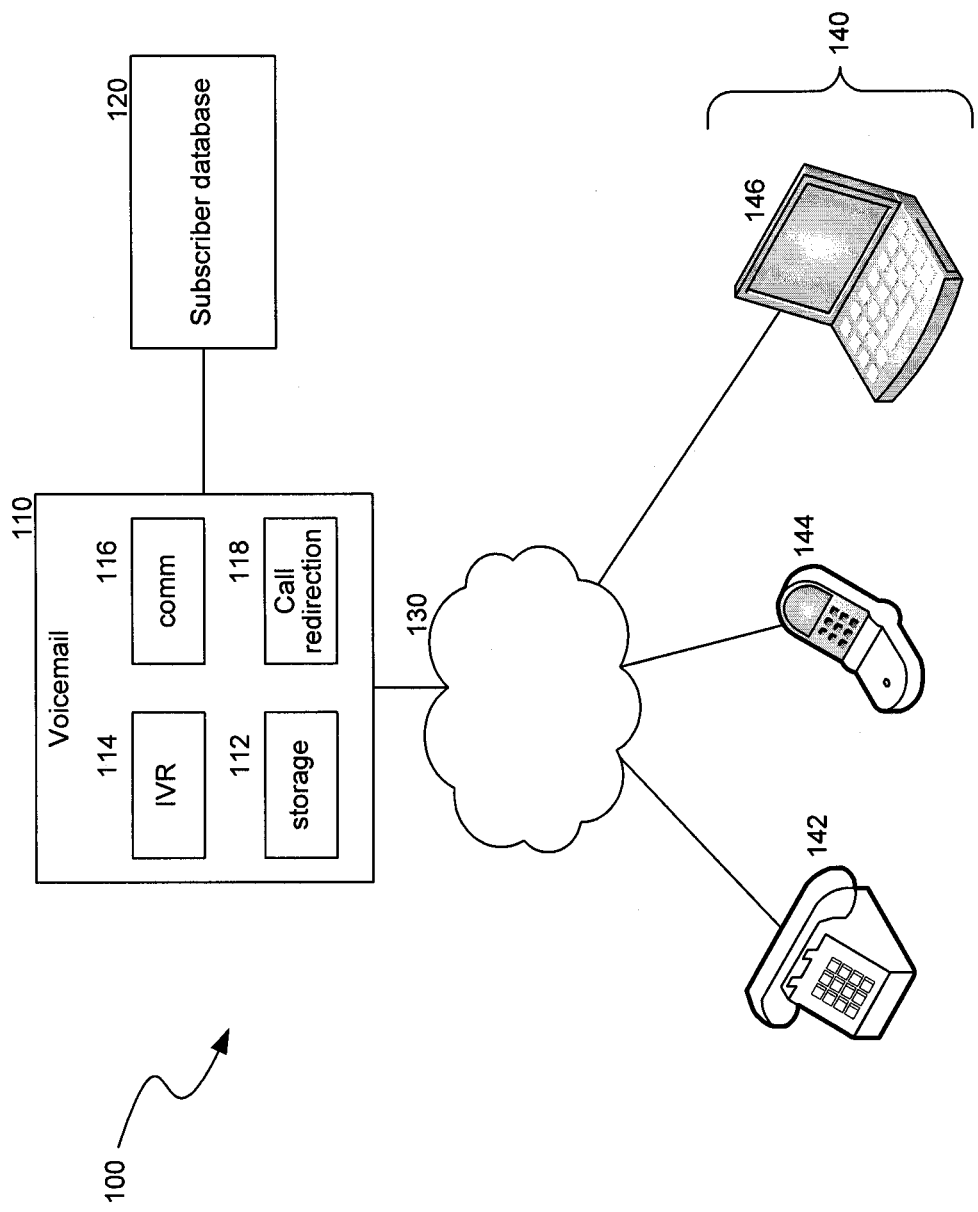
FIG. 1 is a block diagram illustrating a system for updating call redirection information within a telecommunications network.

A system and method for updating call redirection information and other communication redirection information is described. The system may update call redirection information for a subscriber of a telecommunications device based on information received from the subscriber, or may automatically update call redirection information for a subscriber based on one or more detected conditions at the subscriber's telecommunications device. In some cases, redirection of calls or other communications may refer to deflection of calls or other communications, redirection of calls or other communications, routing of calls or other communications, and so on.

In some examples, the system is integrated with and accessed by a subscriber via a voicemail system or call handling server. In response to a request from a subscriber, the system may present one or more options to a subscriber to provide call redirection information. The subscriber may provide call redirection information, such as an alternate number, via an interactive voice response (IVR) component of the voicemail system or call handling server. The subscriber may also access the system and provide call redirection information via a voicemail system or call handling server web interface, a user-selectable menu on the subscriber's telecommunications device, and so on. The voicemail system or call handling server communicates with other components in a telecommunication network to provide the call redirection information. An advantage of utilizing the voicemail system or call handling server is that the voicemail system or call handling server is a service that most subscribers are intimately familiar. Moreover, as will be appreciated from the description herein, the voicemail system or call handling server is also already coupled to and in communication with those network components that need to be updated as part of providing a call redirection feature to subscribers.

In some examples, the system, such as via the voicemail system or call handling server, contacts a subscriber database, such as a home location registry (HLR) or home subscriber server (HSS) to update the subscriber database with information received from the subscriber. For example, the system may update entries within the subscriber database that provide information regarding call handling, such as the handling of calls when the subscriber is unavailable, is busy, does not answer, and so on. Calls that typically go to a subscriber's voicemail may be redirected instead to an alternate number, such as a subscriber's home number.

In some examples, the system may redirect the handling of calls without updating the subscriber database. The system may update information at the voicemail system or call handling server upon receiving a request to redirect or deflect calls to a certain alternate number. Calls that are being redirected to a voicemail number associated with a subscriber according to normal call handling instructions are thus intercepted at the voicemail system or call handling server and directed or deflected to the alternate number provided by the subscriber before they are delivered to the subscriber's voicemail.

In some examples, the system may automatically update the call redirection information for a subscriber based on a detected status of the subscriber's telecommunications device or a detected condition at the telecommunications device. The system, via a component within a telecommunications device or within the network, may detect a certain condition at the telecommunications device (e.g., the device is off or receiving a weak, intermittent signal), transmit information to a component (e.g., the voicemail system or call handling server) within the network, and update call redirection information for the subscriber based on the detected condition.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Suitable System

Figure 2:
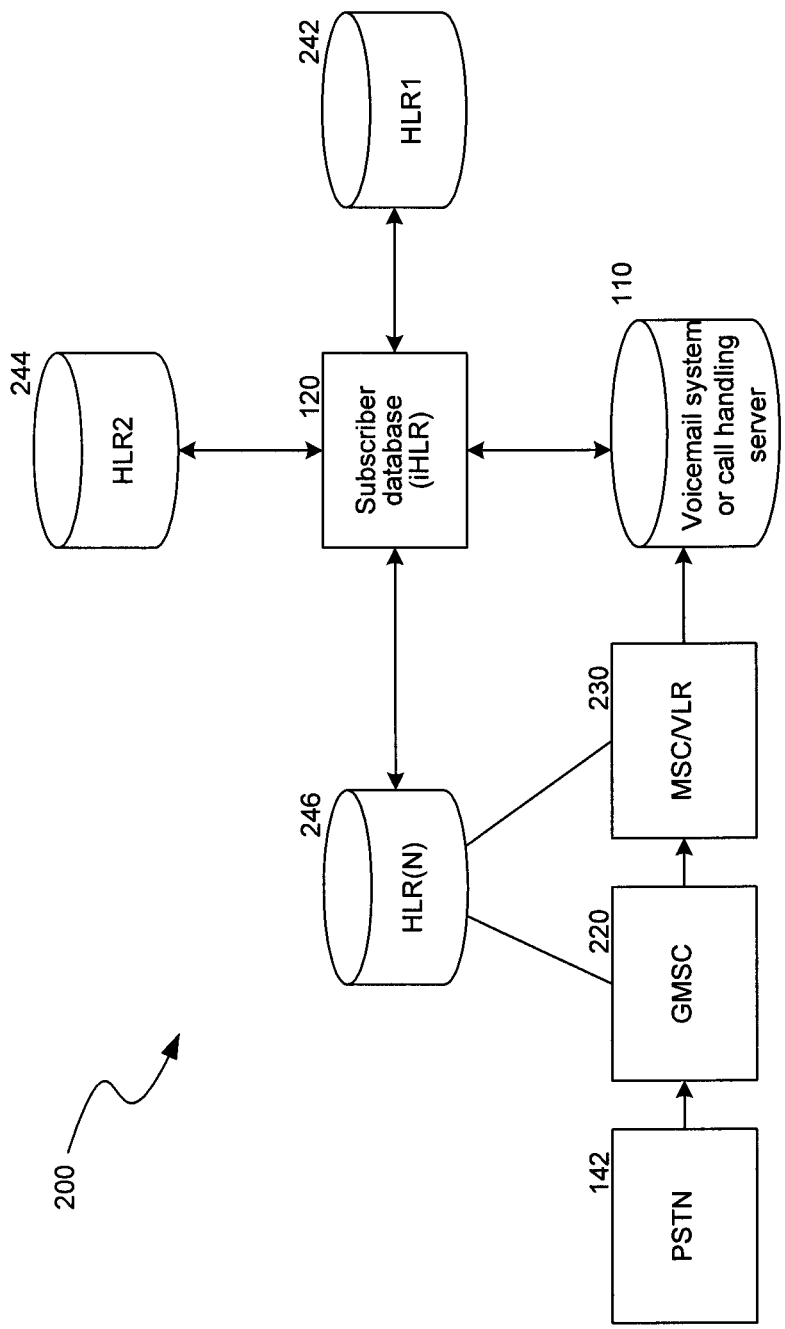
FIG. 2 is a block diagram illustrating suitable components within a telecommunications network for updating subscriber call redirection information.

FIGS. 1 and 2 and the following discussion provide a brief, general description of a suitable environment in which the system can be implemented. Although not required, aspects of the system are described as computer-executable instructions, such as routines executed by a general-purpose data processing device, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), all manner of cellular or mobile phones, telecommunications or mobile devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable media, including magnetically or optically readable computer discs, hard-wired or preprogrammed chips (e.g., EEPROM semiconductor chips), nano-technology memory, biological memory, or other data storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

Referring to FIG. 1, a block diagram illustrating a system 100 for updating call redirection information within a telecommunications network is shown. The system 100 is integrated with a voicemail system or call handling server 110. The voicemail system or call handling server 110 includes typical voicemail components, such as storage components 112, IVR components 114, and so on, programmed to operate and handle voicemail communications and processes within the network 130. The voicemail system or call handling server also includes a communication component 116, for communication with other elements of the telecommunication network such as one or more home location registries (HLRs) 120 or home subscriber servers (HSSs). The system 100 includes a call redirection component 118. The call redirection component 118 may provide information to the registries 120, such as call redirection information, or may store information, such as call redirection information, to enable the redirection of calls to a subscriber.

The voicemail system or call handling server 110 may be accessed by one or more communication devices 140 over a network 130, such as a telecommunication network. The network 130 may include a cell or GSM-based network that communicates with an IP-based network via a gateway. The network may include any network capable of facilitating communications between devices, and is not limited to those shown in the Figure. Examples include GSM (Global System for Mobile Communications), UMA/GAN (Unlicensed Mobile Access/Generic Access Network), CDMA (Code Division Multiple Access), UMTS (Universal Mobile Telecommunications System), EDGE (Enhanced Data for GSM Evolution), LTE (Long Term Evolution), Wimax (Worldwide Interoperability for Microwave Access), Voice Over Internet Protocol (VoIP), TCP/IP, and other technologies.

In some cases, the network 130 incorporates picocells, small base stations having short wireless ranges, transmitting over a licensed spectrum, and generally located in business locations to provide local coverage to that location. Picocells may be directly connected to a network, and often appear as cell sites having a Cell Global Identity (CGI) value within the network. In some cases, the IP-based networks (e.g., UMA networks) incorporate femtocell networks. Similar to VoIP, in femtocell networks voice communications are packetized and transmitted over the Internet. UMA networks typically feature WiFi access points for receiving and sending voice communications over an unlicensed spectrum; femtocell networks typically feature wireless access points broadcasting within unlicensed spectrums of a telecommunications service provider, with conversion of voice communications into IP packets for transmission over the Internet.

The communication devices 140 may be a PSTN device 142, such as a landline phone, a mobile device 144, such as a cell phone, and/or a user computer 146. The voicemail system or call handling server 110 may present a menu of options associated with updating call redirection information to the phone 142 or mobile device 144 via a subscriber menu presented by the IVR component 114. The voicemail system or call handling server 110 may also present a menu of options associated with updating call redirection information to the user computer 146 via a web interface presented by a web interface component (not shown). Thus, the system 100 leverages the capabilities of the voicemail system or call handling server 110 to obtain call redirection information from a subscriber using one or more standard methods of entry to the subscriber's voicemail box. The system 100 thereby facilitates use of the call redirection feature since subscribers are typically very familiar with accessing and using voicemail from a telecommunications device.

Referring to FIG. 2, a block diagram illustrating suitable components 200 within a telecommunications network for updating subscriber call redirection information is shown. It is expected that the call redirection feature describe herein will be most valuable to a telecommunications device subscriber when the telecommunications device subscriber is in an area where telecommunications device coverage is poor. In order to provide a call redirection number under these circumstances, a subscriber calls the voicemail system or call handling server 110 using a PSTN device 140, such as a standard landline telephone. The landline call is redirected to the network 130 via a gateway mobile switching center (GMSC) 220, which communicates with an $HLR_N$ 246 to obtain call redirection information as well as with a mobile switching center (MSC) and visitor location registry (VLR) 230. The MSC/VLR 230 may provide additional information to direct communications between the PSTN device 142 and the telecommunications network 130.

As discussed herein, the voicemail system or call handling server 110 may present an IVR or web interface menu of options to a subscriber in order to obtain call redirection information from the subscriber. The voicemail system or call handling server 110 may then update a subscriber database or registry component 120, such as an integrated HLR (iHLR), which then updates one of multiple HLRs, such as $HLR_1$ 242, $HLR_2$ 244, and $HLR_N$ 246, which contain information for the subscriber. Communications between these components will now be described.

Figure 3:
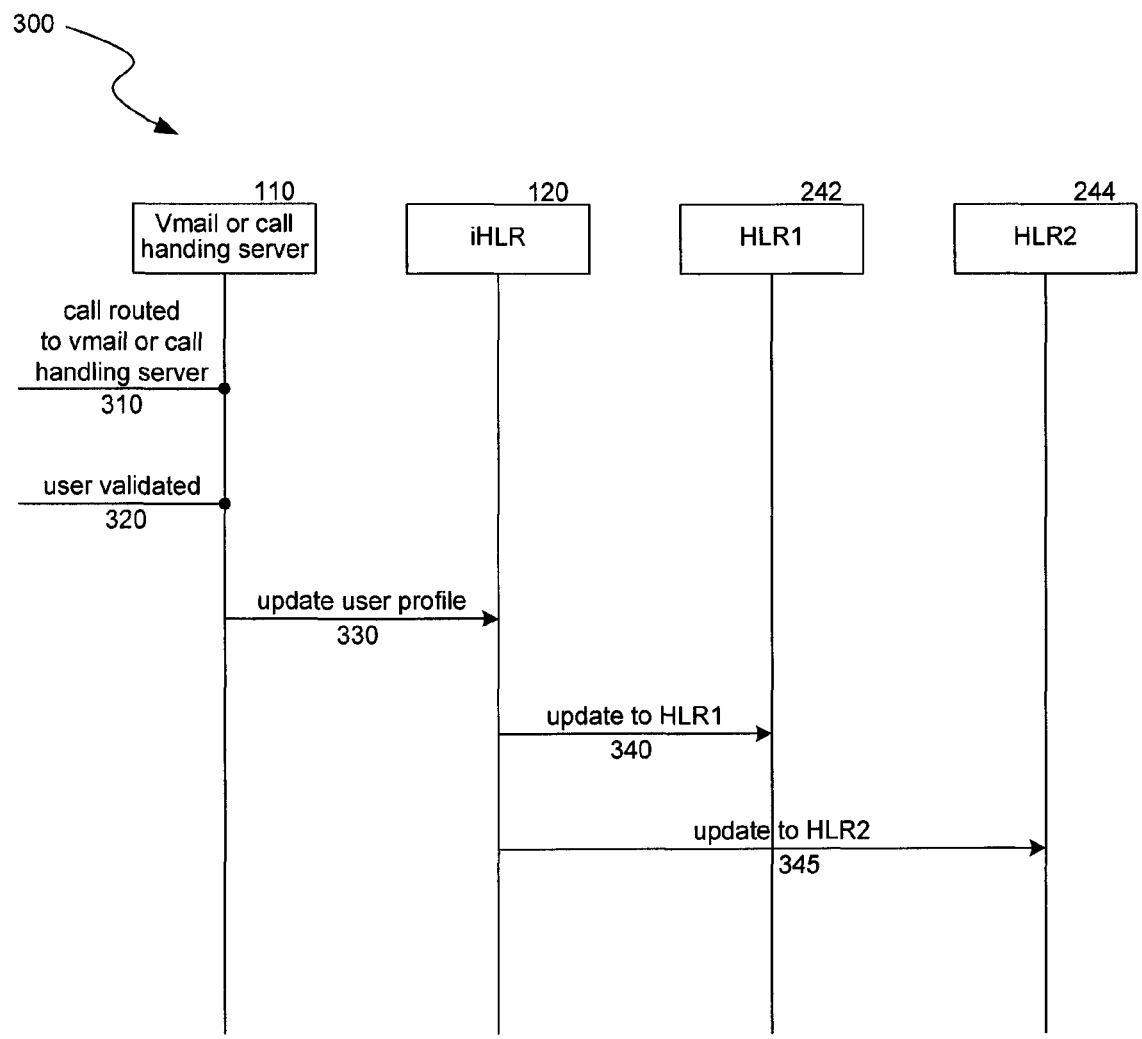
FIG. 3 is a process diagram illustrating the interaction between components within the network during an update of call redirection information.

Referring to FIG. 3, a process diagram 300 illustrating the interaction between components within the network during an update of call redirection information is shown. A call 310 from a subscriber is redirected to the voicemail system or call handling server 110. The voicemail system or call handling server 110 validates the call by obtaining identification information 320 from the subscriber, such as MSISDN and password information associated with the subscriber or other user identifier. Once validated, the system transmits call redirection information 330, such as information received from the subscriber, from the voicemail system or call handling server 110 to the iHLR 120. For example, in a default scenario where a subscriber requests call redirection but does not provide a call redirection number, the system may transmit the 10 digit phone number (XXX-XXX-XXXX) associated with the subscriber's landline phone for use as a call redirection number. The iHLR may then distribute the call redirection information 340 to $HLR_1$ 242 or transmit the call redirection information 345 to $HLR_2$, depending on which HLR contains the subscriber's profile. The receiving HLR updates the subscriber's profile with the call redirection information, and manages future calls to the subscriber based on the updated information.

Updating Call Redirection Information

Figure 4:
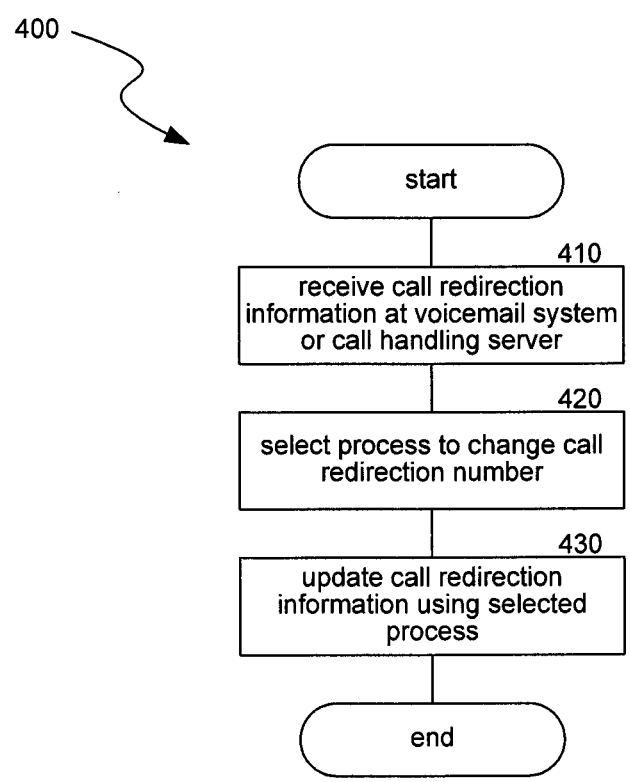
FIG. 4 is a flow diagram illustrating a routine for updating call redirection information within a telecommunication network.

In addition to updating a subscriber profile within a subscriber database, the system may modify call redirection in other ways. Referring to FIG. 4, a flow diagram illustrating a routine 400 for updating call redirection information within a telecommunication network is shown. In step 410, the system receives call redirection information from a subscriber at a voicemail system or call handling server, such as a voicemail gateway. The system may obtain the information via the voicemail system's or call handling server's IVR component, the voicemail system's or call handling server's web interface, or in other ways.

In step 420, the system selects a process in which to change and/or update call redirection for the subscriber. As was previously described, in some cases the system updates the call redirection information by transmitting the information to an subscriber database, which updates an appropriate entry within profile for the subscriber.

In other cases, the system may update the call redirection information directly at the voicemail system or call handling server, as described herein. The system may modify a profile for a subscriber stored at the voicemail system or call handling server, such as a profile that identifies how to handle calls received at the voicemail system or call handling server. The data structure may include information associated with a telecommunications device status (e.g., "busy," "unavailable," and so on), information associated with call redirection information, and so on. The selection of which process to use may be based on the type of call, may be predefined for the subscriber, or may be dynamically determined when the subscriber requests the update. For example, the system may determine that the request is a short term request and choose a method to update call redirection information that minimizes the amount of overhead on the telecommunications system. If updating a subscriber database is resource intensive, for short-term changes the system may therefore modify the profile stored at the voicemail system or call handling server instead.

In step 430, the system updates the call redirection information using the selected process. For example, the system updates entries within a profile associated with a subscriber, or updates a data structure associated with the subscriber and stored by the voicemail system or call handling server. Table 1 shows an example data structure (which may be stored at the subscriber database or stored at the voicemail system or call handling server) after call redirection information is updated for a subscriber:

TABLE 1

| Status of Telecommunications Device | Call Redirection Information |
| --- | --- |
| Busy | 555-555-1212 (voicemail) |
| Unavailable | 555-555-2345 (home phone) |
| No Answer | 555-555-1212 (voicemail) |

In this example, the system default (at the subscriber database) is to redirect all missed calls (busy, unavailable, no answer, and so on) to the subscriber's voicemail box. The voicemail system or call handling server intercepts certain received calls based on the handling instructions shown in the table. Based on the instructions, the voicemail system or call handling server intercepts all missed calls when the subscriber is unavailable (such as when the subscriber is outside coverage of a service provider's network) and redirects the calls to the subscriber's home phone, and not to the subscriber's voicemail box. Of course, the system may include or update other information not shown in the table.

Figure 5:
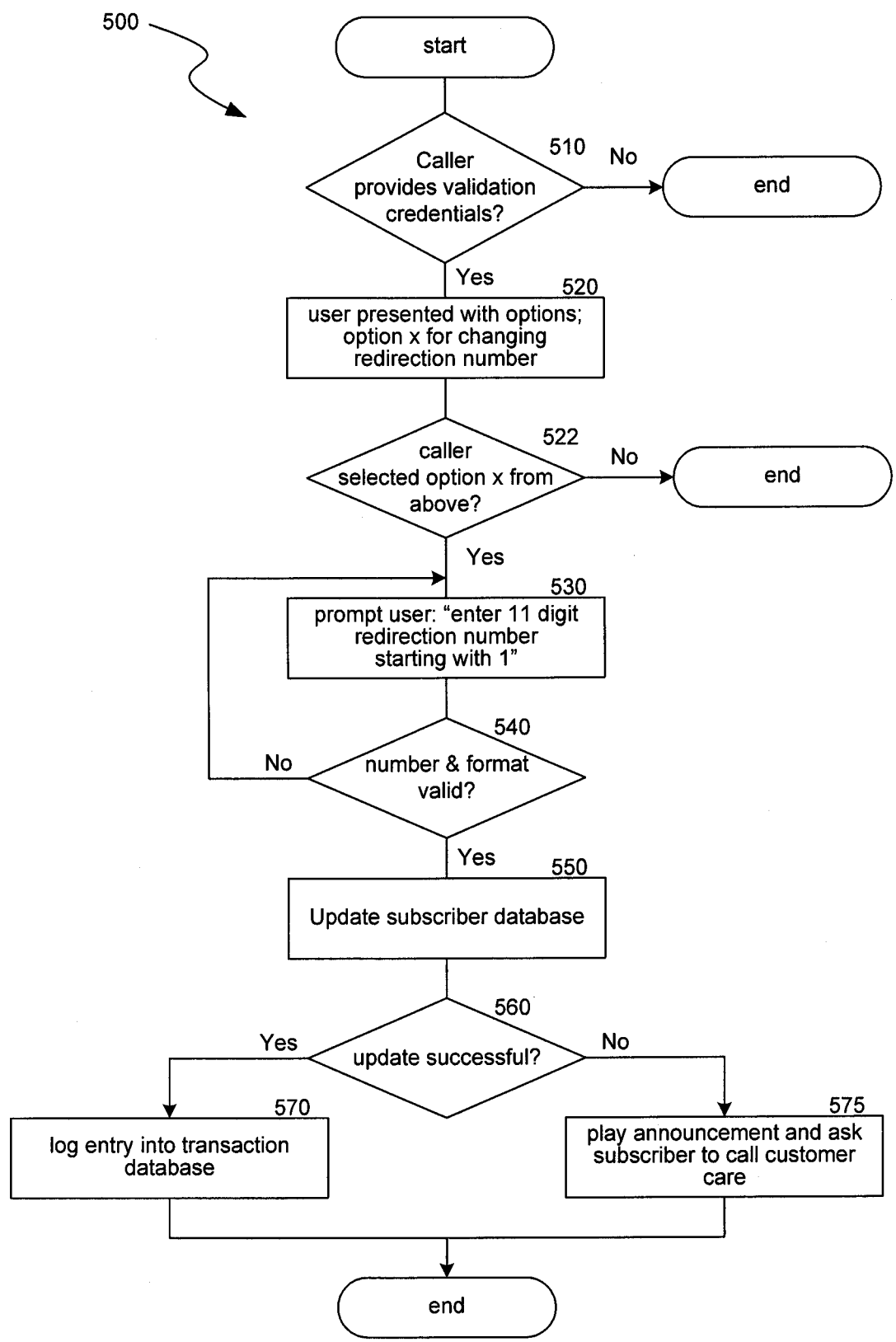
FIG. 5 is a flow diagram illustrating a routine for updating call redirection information via a voicemail system or call handling server within a telecommunication network.

Utilizing a Voicemail system or Call Handling server to Update Call Redirection Information in a Subscriber Database As discussed herein, the system utilizes a voicemail system or call handling server because the voicemail system or call handling server already has access to a subscriber database for a subscriber in order to update voicemail handling information for the subscriber, among other reasons. Referring to FIG. 5, a flow diagram illustrating a routine 500 for updating call redirection information via a voicemail system or call handling server within a telecommunication network is shown. Routine 500 may begin when a subscriber places a call to the voicemail system or call handling server. In step 510, the voicemail system or call handling server receives information, such as validation credentials, from the subscriber that identifies the subscriber, and proceeds to step 520, else the routine ends. In step 520, upon validating the subscriber, the voicemail system or call handling server presents an option to change the number for call redirection. For example, the voicemail system or call handling server may present a number of options associated with voicemail functions as well as an option to change call redirection information via an IVR component or other automated voice response system components.

In step 522, the voicemail system or call handling server receives a selection from the subscriber to update the subscriber's "redirection" number, and proceeds to step 530, else the routine ends. In step 530, the voicemail system or call handling server prompts the subscriber to enter a desired "redirection" number (that is, a number in which to redirect or forward calls). For example, the voicemail system or call handling server may request the subscriber enter the 10 digit number, as well as enter another number (such as "#") when finished. The voicemail system or call handling server may also request associated information, such as information that identifies a time period in which to redirect the calls, information that identifies a time of day in which to redirect calls, and so on. In some cases, the voicemail system or call handling server may store one or more preset redirection numbers, and request the subscriber to select an option associated with a preset number. For example, the voicemail system or call handling server may ask the subscriber to press "1" to select "home" as the redirection number, press "2" to select "work" as the redirection number, or select "9" to enter a new number.

Figure 6:
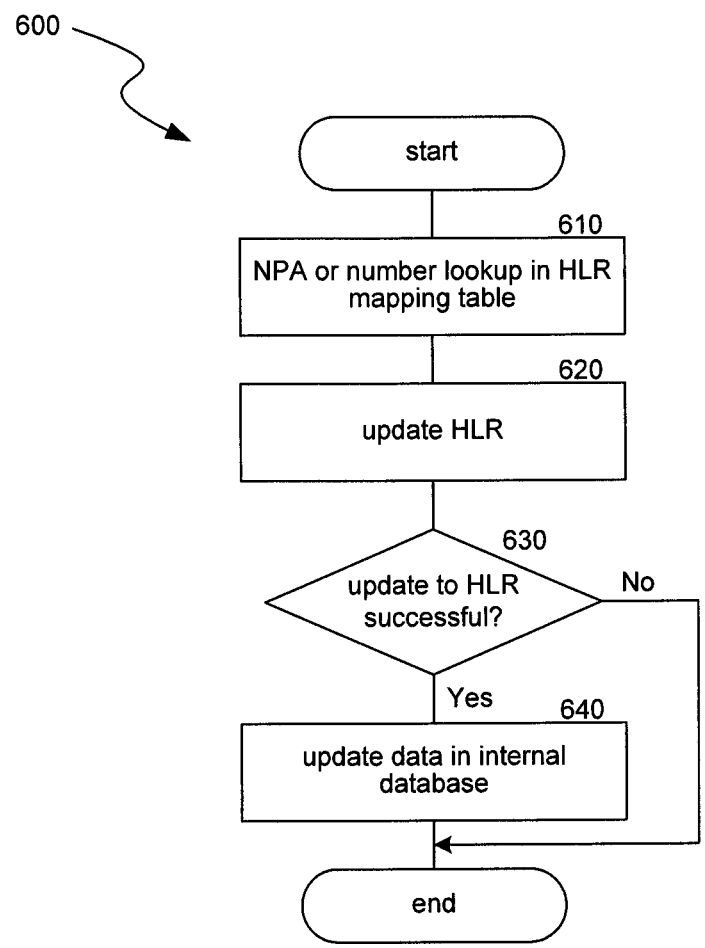
FIG. 6 is a flow diagram illustrating a routine for updating call redirection information for a subscriber within a home location registry of a telecommunication network.

In step 540, the voicemail system or call handling server validates the format of the number, and proceeds to step 550 when the number is valid, else back to step 530. In step 550, the voicemail system or call handling server updates a database entry within an iHLR with the number validated in step 540. FIG. 6 depicts a flow diagram illustrating a routine 600 for updating call redirection information for a subscriber within a home location registry of a telecommunication network. In step 610, the iHLR performs a number lookup or other subscriber information lookup in a mapping table to determine the appropriate HLR to update. In step 620, the system updates an entry within the HLR with the received redirection number. In step 630, the iHLR checks the success of the update. If the update was successful, processing continues at a step 640, where the iHLR updates an internal database with an entry indicating that the update was successful.

Referring back to FIG. 5, once the iHLR updates the appropriate HLR with the call redirection number for the subscriber, the voicemail system or call handling server, in step 560, determines if the update was successful. When successful, the routine 500 proceeds to step 570, and the voicemail system or call handling server logs the transaction. The voicemail system or call handling server may also play an announcement to the subscriber to indicate the call redirection information update was a success. When not successful, the routine 500 proceeds to step 575, and the voicemail system or call handling server plays an announcement to the subscriber to call customer care or explore other options.

In some examples, the system may automatically update call redirection information for a subscriber upon detecting one or more conditions at a telecommunications device associated with the subscriber. Examples of conditions include the telecommunications device being in an off state, the telecommunications device being in a location having poor network coverage, the telecommunications device being busy, the telecommunications device being at or within a certain location having known interference conditions, and so on.

Automatically Updating Call Redirection Information

Figure 7:
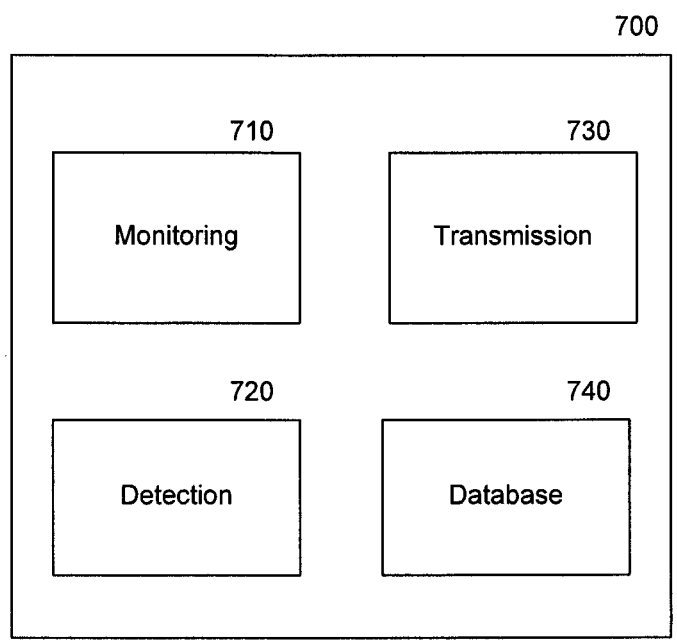
FIG. 7 is a block diagram illustrating components of a telecommunications device used to automatically update call redirection information for a subscriber.

Referring to FIG. 7, a block diagram illustrating components of a telecommunications device 700 used to automatically update call redirection information for a subscriber are shown. The telecommunications device 700 includes a monitoring component 710 configured and/or programmed to monitor conditions at the telecommunications device 700, a detection component 720 configured and/or programmed to detect certain conditions or events at the telecommunications device 700, a transmission component 730 configured and/or programmed to transmit information based on a detected event, such as transmit information to the voicemail system or call handling server described herein, and a database 740 that stores data, data structures, and/or other information relied upon by the other components.

The telecommunications device 700 may also include components that provide information to the monitoring and/or detections components to assist these components in detecting events and conditions at the telecommunications device. Examples include GPS and other location determination components, motion detection components, other network based components, SIM-based components, and so on.

The monitoring and/or detection components 710 and 720 may include one or more scripts or executable software, software configurations, hardware configurations and controls, telecommunications device operating system interfaces, and so on. Executable software may include any software program stored on the telecommunications device 700 or associated memory device. The monitoring and/or detection components 710 and 720 may include hardware interfaces and/or program interfaces, and may execute scripts, applications, and other data stored in database 740. The hardware interfaces may monitor and/or detect events and conditions at the telecommunications device 700, such as powering off or powering on the telecommunications device 700, loss or weakness of a network signal at the telecommunications device 700, movement into an area previously determined and stored (e.g., movement into a geographic location associated with a subscriber's workplace) and so on.

As discussed herein, some or all of the components 710, 720, 730, 740 may reside within the network, in order to update call redirection information when the telecommunications device 700 is powered off, unable to communicate with a network, and so on.

Figure 8:
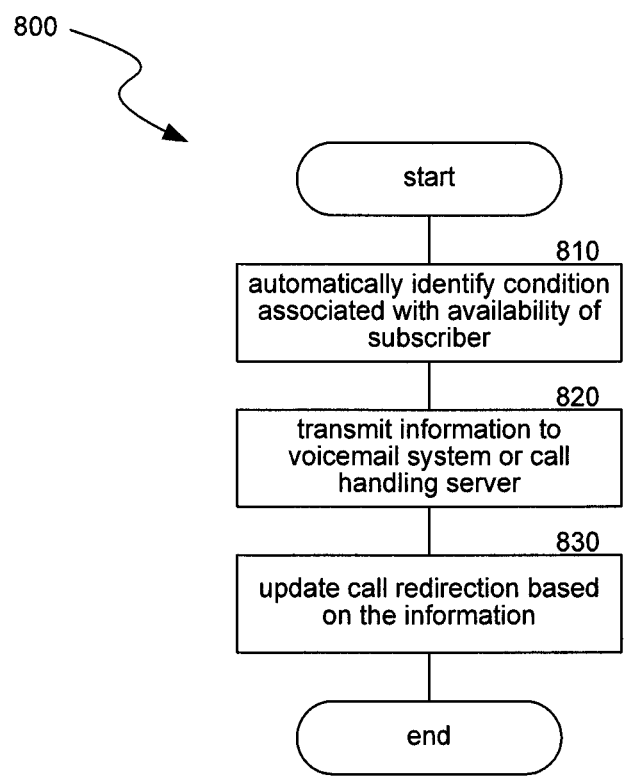
FIG. 8 is a flow diagram illustrating a routine for automatically updating call redirection information for a subscriber of a telecommunication network.

Referring to FIG. 8, a flow diagram illustrating a routine 800 for automatically updating call redirection information for a subscriber of a telecommunication network is shown. The system, via the monitoring component 710, may constantly and/or intermittently monitor conditions at a telecommunications device 700, such as those conditions described herein. The monitoring component 710 may generate a log of information associated with monitored conditions, which may be stored in database 740 and accessed by the detection component 720 during the detection of conditions at the telecommunications device 700. The monitoring component 710 may receive information from the telecommunications device and/or from a presence server (not shown).

In step 810, the system, via a detection component 720, automatically identifies a condition associated with the availability of a subscriber or associated with a status of a subscriber's telecommunications device. For example, the detection component 720 may identify, via information received from a client on the device or from a presence server, that the telecommunications device 700 is having difficulty maintaining a communication session via a network (indicative, for example of, a poor network coverage area), or the quality of the communication channel has progressively weakened over a certain period of time.

The detection component 720 may identify conditions at the telecommunications device that satisfy certain threshold conditions associated with updating call redirection for the telecommunications device. The detection component 720 may review information generated by the monitoring component 710, compare the information to certain rules or algorithms stored in the database 740, and detect a condition when the compared information satisfies one of the rules.

For example, the monitoring component 710 may generate a log of signal strength at various time increments (e.g., every 30 seconds). The database may include a rule that automatically updates call redirection based on signal strength trends, such as "when signal strength decreases for three consecutive time increments, update call redirection information when the telecommunications device is unavailable." The detection component may review the generated log and detect conditions based on the review and a comparison of information within the review and certain rules.

In step 820, the system, via the transmission component 730, transmits information associated with call redirection information to a voicemail system or call handling server within a service provider's network. For example, the system may, in response to detecting a weak signal between the telecommunications device and the network, initiate communications with the voicemail system or call handling server's IVR component or web interface, and provide information to the voicemail system or call handling server using the IVR component or the web interface. The provided information may be stored within the telecommunications device 700 (such as in database 740) or within one or more components within the network. In some cases, the system may provide a signal or notification to the voicemail system or call handling server to switch to redirection calls to one or more numbers stored at the voicemail system or call handling server. In these cases, the signal may cause the voicemail system or call handling server to retrieve a redirection to number associated with the subscriber from a database stored at the voicemail system or call handling server.

In step 830, the system updates the call redirection information based on information received in step 820. The system may employ any of the processes described herein to update call redirection information for the subscriber. In some cases, the system may transmit the information directly to the iHLR or store the information in a data structure at the voicemail system or call handling server. The system may continue to monitor conditions associated with the availability of the subscriber or with the telecommunications device, and update call redirection information accordingly.

The system may anticipate a loss of coverage for a subscriber, and proactively adjust call redirection for the subscriber before a complete loss of coverage. For example, the system may detect a subscriber is at home via a GPS or other positioning components stored in the telecommunications device 700 or located in the network. The system determines that the home location historically provides poor coverage to the subscriber. Based on this determination, the system updates call redirection for the subscriber to the subscriber's home phone number. Thus, the system enables a service provider to provide to a subscriber sent to a subscriber's telecommunications device, regardless of the coverage provided by the service provider's network, among other benefits.

In some examples, the system informs the subscriber after automatically updating call redirection information. For example, the system may present audio or visual information to the subscriber via an interface at the telecommunications device to alert the subscriber that the system is redirection communications to a certain number or address. The system may also alert the subscriber when the updated call redirection has ended. For example, the system may display information such as "Work location detected, redirection all calls to your work number" after updating call redirection information, and then display "Resuming normal call handling," after reverting to a normal handling of calls.

Updating Other Communications Redirection Information

In addition to voice calls, the system may provide similar capabilities for redirection messages intended for a subscriber. For example, the system may utilize the voicemail system or call handling server described herein to obtain alternate address information (such as a subscriber's email address or friend's telecommunications number), and then redirect or deflect messages to the alternate address information. The system may also provide alerts to a subscriber at the subscriber's redirection to number when the subscriber does not provide a suitable address in which to redirect or deflect any received messages.

For example, the system may attempt to redirect a message to a subscriber, determine the subscriber has not provided a suitable address to deliver messages, extract the phone number or identification information (e.g., the contact name) for the sender of the message, and leverage the voicemail system or call handling server's IVR component to initiate a call to the subscriber's redirection number and provide the extracted information to the subscriber. The system may play an announcement to alert the subscriber, such as "you have received a text message from "Mom." Of course, the system may provide other information.

Example Scenarios

Scenario #1: A subscriber is traveling to her parents' house in the country, and realizes her telecommunications device is beginning to lose network coverage. The subscriber calls her voicemail number, and listens to an IVR menu played by the voicemail system. The subscriber selects an option to "redirect all calls when subscriber is unavailable," and is prompted for a phone number. She enters her parents' home phone number, and ends the calls. The voicemail system, upon receiving the parents' number, accesses an entry associated with call redirection for the subscriber in the network's subscriber database, and modifies the entry with the parents' phone number.

Figure 9:
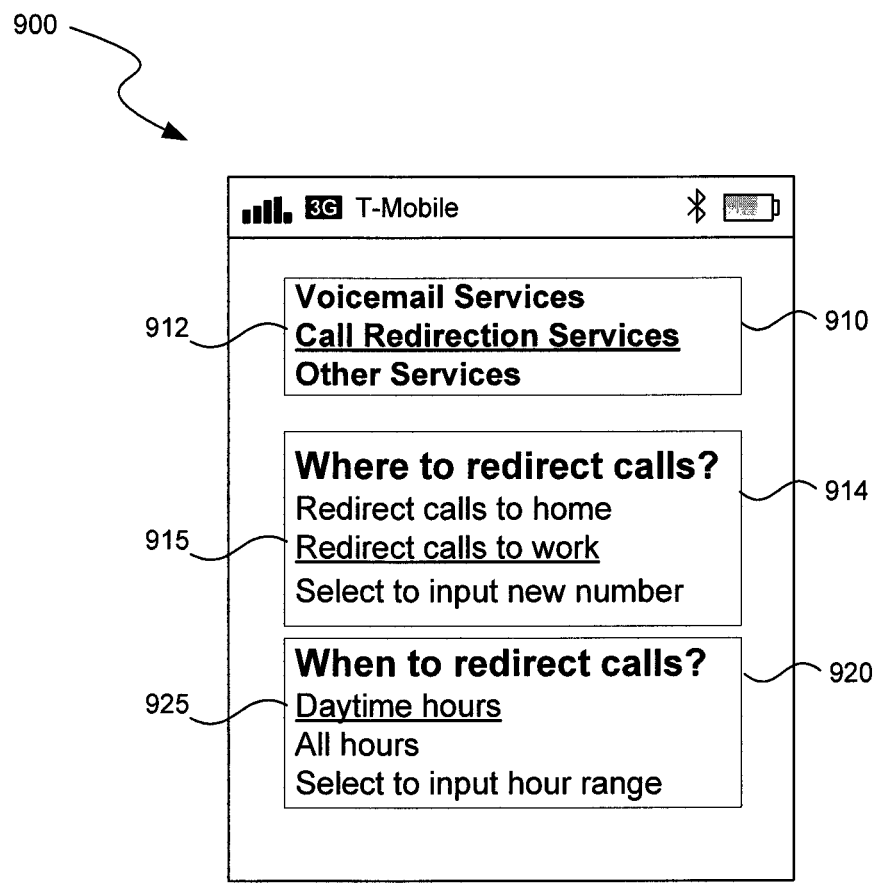
FIG. 9 is a display screen showing an example page displayed by a voicemail system or call handling server that facilitates updating call redirection information.

Scenario #2: A subscriber is running out of "anytime" minutes on his cell phone plan for the current month, and wishes to redirect all calls placed to his phone during daytime hours. He launches a web browser on his device and points the web browser to a URL associated with his voicemail. FIG. 9 is a display screen showing an example page 900 displayed by the voicemail system or call handling server associated with the subscriber's voicemail. Upon receiving multiple options 910 related to voicemail services and call redirection services, the subscriber selects call redirection services 912, and then selects an option 915 to "forward calls to home," from multiple options 914 associated with call redirection numbers. Then, upon receiving options 920 regarding a time of day to forward calls, the subscriber selects an option 925 to forward all calls "during daytime hours." The voicemail system or call handling server, upon receiving the selections, accesses an entry associated with the redirecting of calls for the subscriber in the network's subscriber database, and modifies the entry with the home phone number and the requested time frame.

Scenario #3: At work, a subscriber does not want to receive calls to his telecommunications device, but still wants to be in contact with friends and other parties that generally place calls to the subscriber's telecommunications device. The telecommunications device, via components monitoring the location of the telecommunications device (such as a GPS component), detects the telecommunications device is at a location associated with the subscriber's work, and automatically transmits information to a voicemail system or call handling server to begin redirection calls directed to the telecommunications device to the subscriber's work phone when the telecommunications device is at the work location.

Of course, other scenarios are possible.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the system is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A method implemented by a voicemail system within a wireless telecommunication network for updating call redirection information associated with a wireless subscriber of the wireless telecommunication network, the method comprising:

receiving a call from a wireless subscriber to the voicemail system;

initiating an interactive voice response (IVR) component to communicate with the subscriber, wherein the IVR component: presents a request for information associated with an identification of the subscriber;

receives information from the subscriber that identifies the subscriber is a valid subscriber of the wireless telecommunication network;

presents a menu of options to the subscriber, wherein the menu of options includes an option to update call redirection information for the wireless subscriber;

receives a selection from the wireless subscriber of the option to update the call redirection information for the wireless subscriber;

presents a request for information indicative of a redirection number to utilize for redirecting calls directed to a number associated with a wireless telecommunications device of the wireless subscriber; and receives a new redirection number from the wireless subscriber; and communicating the new redirection number, provided by the wireless subscriber during the received call, to an integrated home location registry to utilize to redirect calls directed to the integrated home location registry within the wireless telecommunication network to update call redirection information associated with the wireless subscriber within the wireless telecommunication network.

2. The method of claim 1, further comprising:
updating a transaction log within the voicemail system to reflect the communication to the integrated home location registry.

3. The method of claim 1, wherein the requested information associated with the identification of the subscriber includes Mobile Subscriber Integrated Services Digital Network-Number (MSISDN) information and password information.

4. The method of claim 1, wherein the requested information associated with the new redirection number to utilize to redirect calls includes information identifying a time period in which to redirect the calls.

5. The method of claim 1, wherein a selection to update the integrated home location registry or the voicemail system is based in part on a dynamic determination by the wireless telecommunication network, wherein the dynamic determination includes the amount of network resources available in the wireless telecommunication network.

6. The method of claim 1, wherein a selection to update the integrated home location registry or the voicemail system is based in part on minimizing network overhead, according to whether the received subscriber request is for a long-term or short-term change.

7. A system for updating call redirection information for a wireless subscriber of a wireless telecommunication network, comprising:

an information reception component located within a voicemail system of the wireless telecommunication network, wherein the information reception component is programmed to receive information from a wireless subscriber of a wireless telecommunication network, including (1) information identifying a wireless telecommunications device associated with the subscriber, (2) information identifying an alternative device to utilize to redirect calls directed to the wireless telecommunications device, (3) information identifying circumstances when the alternative device should be utilized to redirect calls directed to the wireless telecommunications device, wherein the circumstances include at least one of the wireless telecommunications device is unavailable, the wireless telecommunications device is powered off, or the wireless telecommunications device is at a certain location; and an information update component located within the voicemail system, wherein the information update component is configured to communicate with a subscriber database to update an integrated home location registry associated with the subscriber to include the information identifying the alternative device to utilize to redirect calls directed to the wireless telecommunications device and the circumstances when the alternative device should be utilized.

8. The system of claim 7, wherein the information reception component includes an IVR component configured to receive information from the subscriber via interactive voice response commands.

9. The system of claim 7, wherein the information reception component includes a web interface presented to the subscriber and configured to receive information from the subscriber via input received via the web interface.

10. A non-transitory computer-readable storage medium whose contents, when executed, cause a voicemail system within a wireless telecommunication network to perform a method of updating communication redirection information for a wireless subscriber of services received via the wireless telecommunication network, the method comprising:
  receiving at the voicemail system information associated with an address to utilize to redirect or deflect communications that are intended for a wireless telecommunications device associated with the wireless subscriber but are not received by the wireless telecommunications device;
  updating an entry within a subscriber profile associated with communications not being received by the wireless telecommunications device,
    wherein the entry updated corresponds to whether the received address for redirection or deflection is utilized if the device is unavailable, powered off, or is at a certain location; and
  communicating the received information from the voicemail system to a subscriber profile within the wireless telecommunication network to update an integrated home location registry entry associated with the subscriber.

11. The non-transitory computer-readable medium of claim 10, wherein the information associated with the address in which to redirect or deflect communications is received via an IVR component employed by the voicemail system.

12. The non-transitory computer-readable medium of claim 10, wherein the information associated with the address in which to redirect or deflect communications is received via a web interface employed by the voicemail system.

13. The non-transitory computer-readable medium of claim 10, wherein the received information associated with the address is the address to utilize to redirect or deflect communications.

14. The non-transitory computer-readable medium of claim 10, wherein the received information associated with the address is a code indicative of the address to utilize to redirect or deflect communications.

15. The non-transitory computer-readable medium of claim 10, wherein the subscriber profile is stored within a subscriber database for the wireless telecommunication network.

16. The non-transitory computer-readable medium of claim 10, wherein the subscriber profile is stored within a data structure of the voicemail system or call handling server.

17. The non-transitory computer-readable medium of claim 10, further comprising:
  updating an entry within the subscriber profile associated with communications not received by the wireless telecommunications device when the wireless telecommunications device is busy.

18. The non-transitory computer-readable medium of claim 10, wherein the address to utilize is a phone number associated with the subscriber other than a phone number for the wireless telecommunications device, and the redirected or deflected communications are voice calls to the phone number for the wireless telecommunications device.

19. The non-transitory computer-readable medium of claim 10, wherein the address to utilize is a email address associated with the subscriber other than a phone number for the wireless telecommunications device, and the redirected or deflected communications are text messages to the phone number for the wireless telecommunications device.

* * * * *